United States Patent
Shibata et al.

(10) Patent No.: US 10,444,375 B2
(45) Date of Patent: Oct. 15, 2019

(54) POSITIONING SYSTEM, POSITIONING METHOD, AND POSITIONING STATION

(71) Applicant: PANASONIC INTELLECTUAL PROPERTY MANAGEMENT CO., LTD., Osaka (JP)

(72) Inventors: Jun Shibata, Kanagawa (JP); Toru Okada, Kanagawa (JP); Katsunao Takahashi, Osaka (JP); Kunihiko Sakaibara, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 273 days.

(21) Appl. No.: 15/524,454

(22) PCT Filed: Jan. 26, 2016

(86) PCT No.: PCT/JP2016/000364
§ 371 (c)(1),
(2) Date: May 4, 2017

(87) PCT Pub. No.: WO2016/132682
PCT Pub. Date: Aug. 25, 2016

(65) Prior Publication Data
US 2018/0239029 A1    Aug. 23, 2018

(30) Foreign Application Priority Data
Feb. 18, 2015 (JP) .................................. 2015-029138

(51) Int. Cl.
*G01S 19/44* (2010.01)
(52) U.S. Cl.
CPC .................................. *G01S 19/44* (2013.01)

(58) Field of Classification Search
CPC .......... G01S 19/21; G01S 19/42; G01S 19/43; G01S 19/44
(Continued)

(56) References Cited

U.S. PATENT DOCUMENTS

| | | |
|---|---|---|
| 6,753,810 B1 | 6/2004 | Yang et al. |
| 2007/0057839 A1 | 3/2007 | Kagawa |
| 2011/0205109 A1 | 8/2011 | Miyake et al. |

FOREIGN PATENT DOCUMENTS

| | | |
|---|---|---|
| JP | 10-246764 | 9/1998 |
| JP | 2003-270319 | 9/2003 |

(Continued)

OTHER PUBLICATIONS

The Extended European Search Report dated Jan. 15, 2018 for European Patent Application No. 16752075.8.
(Continued)

*Primary Examiner* — Dao L Phan
(74) *Attorney, Agent, or Firm* — Greenblum & Bernstein, P.L.C.

(57) ABSTRACT

The present disclosure is effective in easily estimating an integer value bias at a high speed. A processor of a positioning system, a positioning method, and a positioning station performs interference positioning through calculation processing based on positioning data of the base station and positioning data of the positioning station. A plurality of calculation processing items are performed in parallel with different time points as start time points. Thus, even in a case where a situation in which the time required for the calculation of a fix solution differs depending on time point at which time point the calculation processing starts, there is a possibility that one of a plurality of calculation processing items can calculate the fix solution at an earlier time than in a case where single calculation processing performs the
(Continued)

calculation. Therefore, it is possible to easily estimate the integer value bias at the high speed.

21 Claims, 9 Drawing Sheets

(58) Field of Classification Search
USPC .................................................. 342/357.27
See application file for complete search history.

(56) References Cited

FOREIGN PATENT DOCUMENTS

| JP | 2005-164395 | 6/2005 |
|---|---|---|
| WO | 2010/035384 | 4/2010 |
| WO | 2013/002861 A2 | 1/2013 |

OTHER PUBLICATIONS

International Search Report (ISR) in International Pat. Appl. No. PCT/JP2016/000364, dated Apr. 26, 2016.

POSITIONING SYSTEM, POSITIONING METHOD, AND POSITIONING STATION

TECHNICAL FIELD

The present disclosure relates to a positioning system, a positioning method, and a positioning station.

BACKGROUND ART

In PTL 1, integrated value data of carrier wave phases of a satellite signal on a positioning station side at a time point is acquired, and integer value bias included in an integrated value of the carrier wave phases of the satellite signal observed by the positioning station is estimated by associating the integrated value data of the carrier wave phases on the positioning station side at the time point with the integrated value data of the carrier wave phases on the base station side at a plurality of time points prior to the time point. In this way, it is possible to determine the integer value bias with a high accuracy in a short time.

CITATION LIST

Patent Literature

PTL 1: Japanese Patent Unexamined Publication No. 2005-164395

SUMMARY OF THE INVENTION

The present disclosure provides a positioning system, a positioning method, and a positioning station that easily perform an estimation of integer value bias at a high speed.

Processor in the positioning system, the positioning method, and the positioning station in the present disclosure performs an interference positioning through calculation processing based on positioning data of a base station and positioning data of a positioning station. A plurality of calculation processing items are performed in parallel with different time points as start time points.

The positioning system, the positioning method, and the positioning station in the present disclosure are effective in easily performing the positioning at a high speed.

DESCRIPTION OF EMBODIMENTS

Hereinafter, details of the exemplary embodiments will be described with reference to the drawings as appropriate. In some cases, the detailed descriptions more than the necessity will be omitted. For example, detailed descriptions for well-known matters or overlapping descriptions for substantially the same configurations will be omitted. This is to avoid the unnecessary redundancy in the descriptions hereinafter and to facilitate the easy understanding to those skilled in the art.

The drawings attached hereto and the descriptions hereinafter are provided for the sufficient understanding to those skilled in the art, and do not intend to limit the scope described in the Claims.

Exemplary Embodiment 1

Hereinafter, the exemplary embodiment 1 will be described using FIGS. 1 to 7.

[1-1. Configuration]

Figure 1:
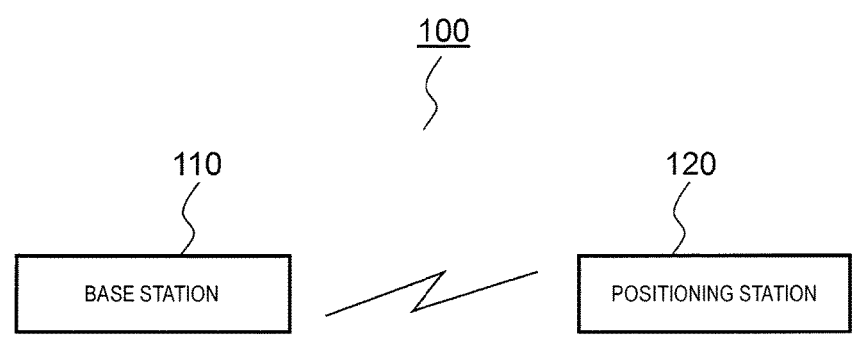
FIG. 1 is a conceptual diagram of a position detection system in an exemplary embodiment 1.

FIG. 1 is a conceptual diagram of a positioning system in an exemplary embodiment 1.

Positioning system 100 includes base station 110 and positioning station 120.

Base station 110 is installed on a position where the coordinates are known on the earth. Positioning station 120 is installed on an object for which the coordinates are wanted to be obtained. Positioning system 100 obtains the coordinates of positioning station 120 on the earth by performing the positioning of positioning station 120.

Base station 110 and positioning station 120 receive a positioning signal from a positioning satellite (not illustrated).

Base station 110 generates positioning data based on the received positioning signal. Base station 110 sends the generated positioning data to positioning station 120.

Positioning station 120 performs interference positioning using the received positioning data and the positioning data generated by positioning station 120 by a Real Time Kinematic (RTK) method. A computer or the like in which a dedicated terminal and dedicated software for positioning are installed is included in the positioning station.

Figure 2:
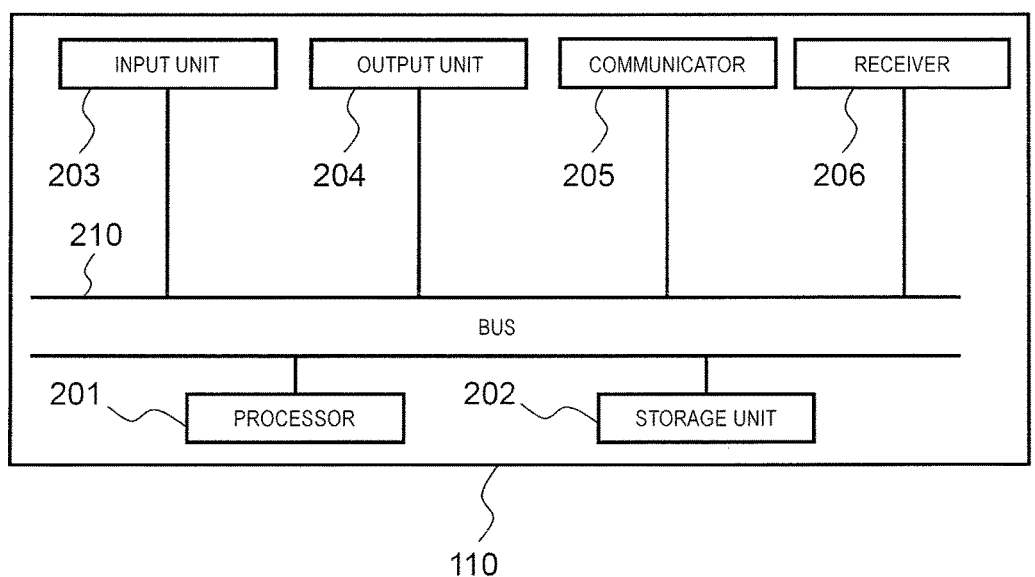
FIG. 2 is a block diagram of a base station in the exemplary embodiment 1.

FIG. 2 is a block diagram of the base station in the exemplary embodiment 1.

Base station 110 includes processor 201, storage unit 202, input unit 203, output unit 204, communicator 205, receiver 206, and bus 210.

Processor 201 controls other elements in base station 110 via bus 210. As an example, processor 201 can be configured using a general purpose central processing unit (CPU). In addition, processor 201 can execute a predetermined program. The positioning data can be generated based on the positioning signal by the program being executed by processor 201.

Storage unit 202 acquires various information items from other elements and holds the information items temporarily or permanently. Storage unit 202 is a general name of a so-called primary storage device and a secondary storage device, and a plurality of storage units 202 may be physically arranged. For example, a dynamic random access memory (DRAM), a hard disk drive (HDD), and a solid state drive (SSD) are used in the configuration of storage unit 202.

Input unit 203 receives information from the outside. In the information received by input unit 203 from the outside, information relating to the input from a user of base station 110 is included. As an example, it is possible to configure input unit 203 using an input interface such as a keyboard.

Output unit 204 presents the information to the outside. Information relating to the positioning is included in the information presented by the output unit. As an example, it is possible to configure output unit 204 using an existing output interface such as a display.

Communicator 205 performs communications with external devices via communication path. Positioning station 120 is included in the device with which the communicator 205 communicates.

As an example, it is possible to configure communicator 205 using a communication interface that can communicate with the existing communication network such as a wireless LAN communication network or a 3G communication network.

Receiver 206 receives the positioning signal from the positioning satellite. In the present exemplary embodiment, a GPS satellite is used as an example of the positioning satellite. The GPS satellite transmits an L1 signal (1575.42 MHz), an L2 signal (1227.60 MHz), and the kike as the positioning signals.

The configuration of base station 110 listed above is an example. The configuration can be made by integrating a part of each configuration element of base station 110. The configuration can be made by dividing a part of each configuration element of base station 110 to a plurality of elements. A part of each configuration element of base station 110 can be omitted. The configuration can be made by adding other elements to base station 110. In addition, base station 110 in the present disclosure includes a reference station established by a national or a local government.

Figure 3:
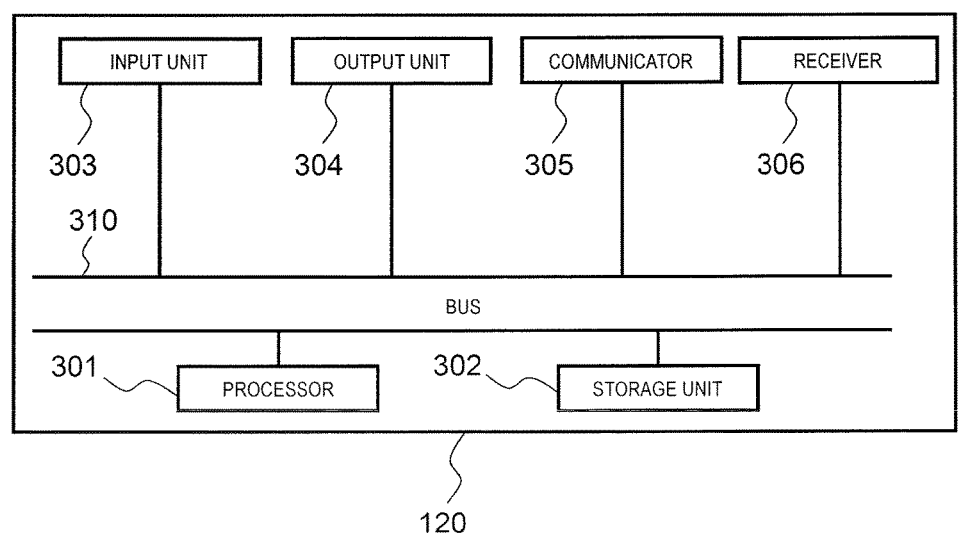
FIG. 3 is a block diagram of a positioning station in the exemplary embodiment 1.

FIG. 3 is a block diagram of the positioning station in the exemplary embodiment 1.

Positioning station 120 includes processor 301, storage unit 302, input unit 303, output unit 304, communicator 305, receiver 306, and bus 310.

Processor 301 controls other elements in positioning station 120 via bus 310. As an example, processor 301 can be configured using a general purpose central processing unit (CPU). In addition, processor 301 can execute a predetermined program. The positioning data can be generated based on the positioning signal by the program being executed by processor 301.

Storage unit 302 acquires various information items from other elements and holds the information items temporarily or permanently. Storage unit 302 is a general name of a so-called primary storage device and a secondary storage device, and a plurality of storage units 302 may be physically arranged. For example, a dynamic random access memory (DRAM), a hard disk drive (HDD), and a solid state drive (SSD) are used in the configuration of storage unit 302.

Input unit 303 receives information from the outside. In the information received by input unit 303 from the outside, information relating to the input from a user of positioning station 120 is included. As an example, it is possible to configure input unit 303 using an input interface such as a keyboard.

Output unit 304 presents the information to the outside. Information relating to the positioning is included in the information presented by the output unit. As an example, it is possible to configure output unit 304 using an existing output interface such as a display.

Communicator 305 performs communications with external devices via communication path. Base station 110 is included in the device with which the communicator 305 communicates. As an example, it is possible to configure communicator 305 using a communication interface that can communicate with the existing communication network such as a wireless LAN communication network or a 3G communication network.

Receiver 306 receives the positioning signal from the positioning satellite. In the present exemplary embodiment, the GPS satellite is used as an example of the positioning satellite. The GPS satellite transmits the L1 signal (1575.42 MHz), the L2 signal (1227.60 MHz), and the kike as the positioning signals.

The configuration of positioning station 120 listed above is an example. The configuration can be made by integrating a part of each configuration element of positioning station 120. The configuration can be made by dividing a part of each configuration element of positioning station 120 to a plurality of elements. A part of each configuration element of positioning station 120 can be omitted. The configuration can be made by adding other elements to positioning station 120.

[1-2. Operation]

The positioning processing performed by the positioning system configured as described above will be described.

Figure 4:
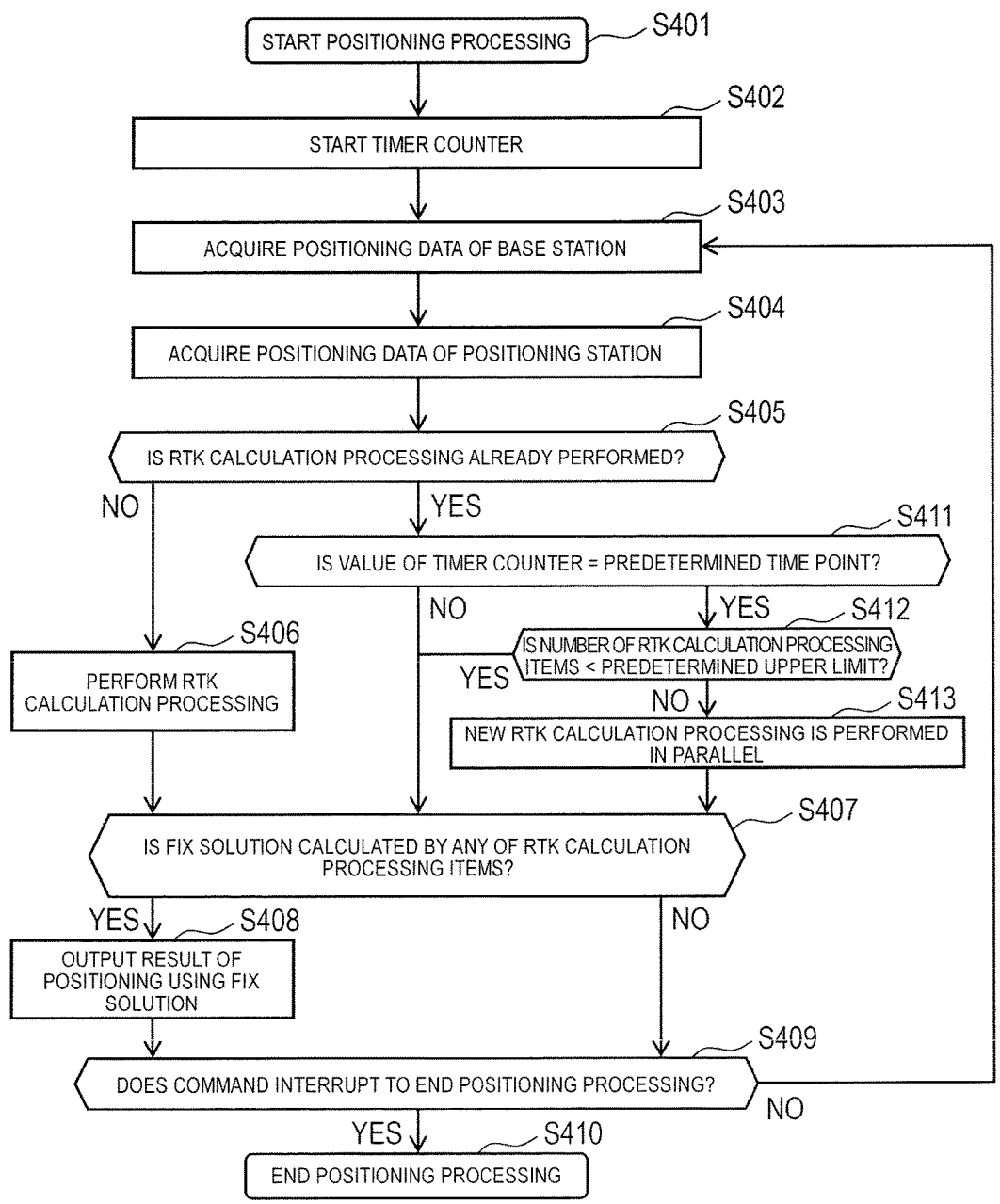
FIG. 4 is a flowchart illustrating positioning processing in the exemplary embodiment 1.

FIG. 4 is a flowchart illustrating the positioning processing in the exemplary embodiment 1.

In the present exemplary embodiment, an example of the positioning processing performed by processor 301 in positioning station 120 will be described. The positioning processing in the present disclosure is not limited to the positioning processing performed by positioning station 120 itself. The positioning processing may be performed by a general purpose computer added inside the positioning system.

In Step S401, processor 301 starts the positioning processing. The timing for starting the positioning processing can be arbitrarily determined. For example, processor 301 may start the positioning processing when a power of positioning station 120 is turned on. In addition, processor 301 may start the positioning processing when a command for starting the positioning processing is input by input unit 303 in positioning station 120.

In Step S402, processor 301 starts a timer counter. The timer counter performs a count-up according to a predetermined cycle. The timer counter may be configured in terms of hardware or software.

In Step S403, processor 301 acquires the positioning data of base station 110. Processor 301 acquires the positioning data of base station 110 via communicator 305. Processor 301 sequentially acquires the positioning data of base station 110. Processor 301 records the acquired positioning data of base station 110 in storage unit 202. The positioning data of base station 110 is data generated by processor 201 in base station 110. Processor 201 generates the positioning data based on the positioning signal received by receiver 206.

In Step S404, processor 301 acquires the positioning data of positioning station 120. Processor 301 acquires the positioning data by generating the positioning data based on the positioning signal received by receiver 306. Processor 301 records the acquired positioning data of positioning station 120 in storage unit 302.

Here, the description for the positioning data will be performed. Pseudo-distance information and carrier wave phase information are included in the positioning data in the present exemplary embodiment.

The pseudo-distance information is information relating to a distance between the satellite and the station itself (the base station and the positioning station). The pseudo-distance information can be generated by the processor analyzing the positioning signal. The processor can obtain an arrival time of the positioning signal based on two items: (1) a difference between a pattern of a code carried by the positioning signal and a pattern of a code generated by itself and (2) a time of signal generation in the satellite included in a message (NAVDATA) included in the positioning signal and a time of signal reception by itself. The processor can obtain the distance to the satellite by multiplying the arrival time by the speed of light. This distance includes an error caused by a difference between a clock of the satellite and a clock of itself. Usually, in order to reduce this error, the pseudo-distance information is generated with respect to four satellites.

The carrier wave phase information means a phase of the positioning signal received by itself. The positioning signal (the L1 signal, L2 signal, and the like) is a predetermined sine wave. The carrier wave phase information can be generated by the processor analyzing the positioning signal received by the receiver.

As described above, processor 201 in base station 110 and processor 301 in positioning station 120 can respectively generate the positioning data.

In Step S405, processor 301 determines whether or not the RTK calculation processing is already performed. The RTK calculation processing is calculation processing that executes the RTK method. A content of the RTK method will be described below. Every time the RTK calculation processing is performed, processor 301 causes a predetermined counter to count up. Processor 301 can determine whether or not the RTK calculation processing is performed already by checking the counter.

In Step S406 (NO in Step S405), processor 301 performs the RTK calculation processing.

Here, the description of the RTK calculation processing will be performed.

The RTK calculation processing is calculation processing in which the RTK method is executed, which is one of the interference positioning.

In the RTK method, the positioning of the positioning station is performed using the integrated value of the carrier wave phases of the positioning signal transmitted from the positioning satellite. The integrated value of the carrier wave phases is a sum of (1) the number of waves of the positioning signal and (2) the phases from the satellite to a certain point. If the integrated value of the carrier wave phases is obtained, the frequency (and the wavelength) of the positioning signal is known. Therefore, the distance from the satellite to the certain point can be obtained. Since the number of waves of the positioning signal is an unknown number, the number is referred to as integer value bias.

Important things in executing the RTK method are elimination of noises and estimation of the integer value bias.

In the RTK method, the elimination of the noises is performed by calculating a difference called a double difference. The double difference is a difference between the values of the difference (single difference) of the integrated value of the carrier wave phases by one receiver with respect to the two satellites, which is respectively calculated by the two receivers (base station 110 and positioning station 120 in the present exemplary embodiment). In the present exemplary embodiment, four satellites are used for the positioning using the RTK method. Accordingly, the double differences are calculated as much as the number of combinations of the four satellites. In this calculation, the positioning data of base station 110 and the positioning data of positioning station 120 acquired in Step S403 and Step S404 are used.

In the RTK method, the estimation of the integer value bias can be performed using various methods. As an example, in the present exemplary embodiment, the estimation of the integer value bias is performed by: (1) an estimation of a float solution using a least squares method, and (2) an execution of a procedure called examination of the fix solution based on the float solution.

The estimation of the float solution using the least squares method is performed by creating a simultaneous equations using the combinations of the double differences generated for each time unit, and by solving the simultaneous equations using the least squares method. The simultaneous equations are generated for each time unit called epoch. In this calculation, the positioning data of base station 110 and the positioning data of positioning station 120 acquired in Step S403 and Step S404 and the known coordinates of the base station are used. The integer value bias estimated in this way is called the float solution.

The true value of the integer value bias is an integer while the float solution obtained as described is a real number. Therefore, it is necessary to make the float solution be the integer value by rounding up the float solution. However, a plurality of possible candidates are considered as the combination of the round-up of the float solution. Accordingly, it is necessary to examine which candidate is a correct integer value. A solution that is assumed to be somewhat reliable as the integer value bias through the examination is called as the fix solution. In order to effectively narrow down the candidates of the integer value, the positioning data of base station 110 acquired in Step S403 and Step S404 is used.

Processor 301 performs the above-described calculation processing as the RTK calculation processing.

In Step S407, processor 301 determines whether or not any of the RTK calculation processing items calculates the fix solution. As described above, in the RTK calculation processing, processor 301 performs a plural number of complicated estimation processing items and complicated examination processing items. Accordingly, a certain amount of time is required for processor 301 to obtain the fix solution. In addition, there is possibility that the fix solution cannot be obtained depending on the conditions. In a case where any of the calculation processing items does not calculate the fix solution (NO in Step S407), the processing performed by processor 301 proceeds to Step S409.

In Step S408 (YES in Step S407), processor 301 outputs the result of positioning using the fix solution. Processor 301 calculates the coordinates of positioning station 120 on the earth based on the fix solution, and displays the result thereof on output unit 304.

In Step S409, processor 301 determines whether or not a command to end the positioning processing interrupts the processing. By inputting the command to end the positioning processing by the user of positioning station 120 via input unit 303, the command to end the positioning processing interrupts the positioning processing. In a case where the command interrupts to end the positioning processing (YES in Step S409), the positioning processing ends in Step S410.

In a case where the command does not interrupt to end the positioning processing (NO in Step S409), the processing performed by processor 301 returns to Step S403.

When the processing returns to Step S403, the processing proceeds to Step S405 again through Step S403 and Step S404. In Step S403 and Step S404, the positioning data of base station 110 and the positioning data of positioning station 120 are updated to the latest data item's.

In Step S405, in a case where the RTK calculation processing is performed (YES in Step S405), the processing performed by processor 301 branches to Step S411.

In Step S411, processor 301 determines whether or not the value of the timer counter reaches predetermined time point. This predetermined time point can be determined in advance in variously methods according to an object. In a case where the value of the timer counter reaches the predetermined time point (YES in Step S411), (there is a possibility that) the processing for newly performing the RTK calculation is performed as described below. In this sway, processor 301 can perform the RTK calculation processing with the different time points as the start time points.

In the present exemplary embodiment, in order to periodically perform the RTK calculation processing, the predetermined time point is set as a time point that is obtained by adding an integer multiple of a certain constant to the time point at which the RTK calculation is initially performed. In this way, the RTK calculation can be periodically (for example, every one minute) performed. Another example of determining the predetermined time point will be described below.

In Step S412, processor 301 determines whether or not the number of RTK calculation processing items exceeds a predetermined upper limit. The number of RTK calculation processing items can be determined using the counter described in Step S405. A certain amount of resources of processor 301 is consumed in the RTK calculation processing. Accordingly, it is desirable to set the upper limit of the number of RTK calculation processing items in advance. However, the processing in Step S412 is not necessary. In a case where the number of RTK calculation processing items reaches the upper limit (Yes in Step S412), the processing by processor 301 proceeds to Step S407.

In Step S413 (NO in Step S412), processor 301 performs new RTK calculation processing in parallel. When the new RTK calculation processing is performed, the positioning data used in the RTK calculation processing is likely to be different in a high possibility from that used in the RTK calculation processing that has been performed so far. That is because the start time point of the new RTK calculation processing is different from that of the RTK calculation processing that has been performed so far.

In the present exemplary embodiment, in Step S403 and Step S404, the positioning data is updated to that in the vicinity of the start time point of the RTK calculation processing. When the positioning data is updated to other data, a value of a parameter needed for the RTK calculation processing is initialized to a value different from the value used in the previous RTK calculation processing. In this way, the conditions for obtaining the float solution and the fix solution in the RTK calculation processing are changed. When the conditions for obtaining the float solution and the fix solution in the RTK calculation processing are changed, there is a possibility that the fix solution can be calculated earlier than that in other RTK calculation processing.

Figure 5:
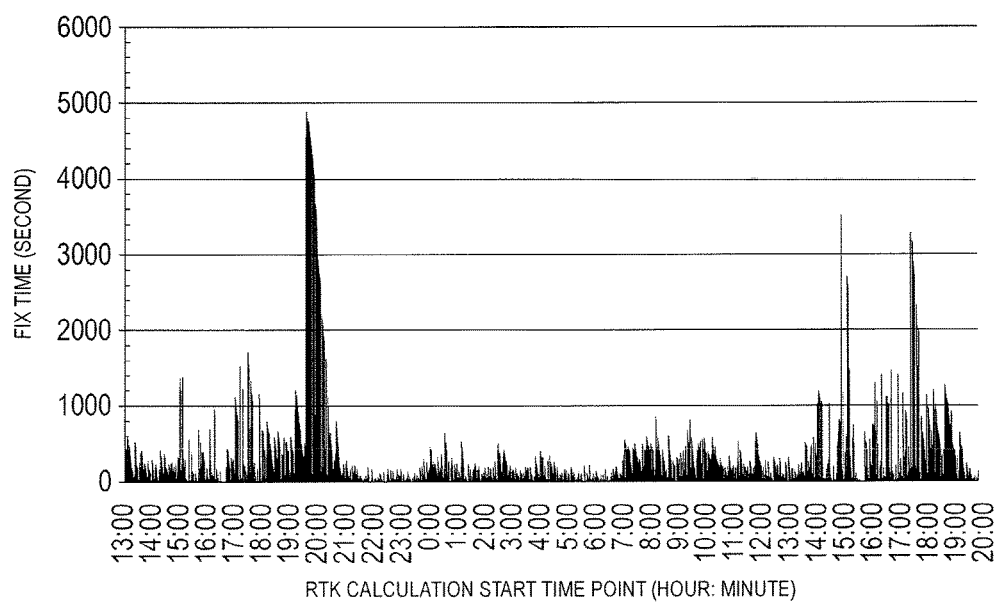
FIG. 5 is a diagram illustrating distribution of time required for calculation of a fix solution by single RTK calculation processing.

FIG. 5 is a diagram illustrating distribution of time required for the calculation of the fix solution by the single RTK calculation processing. Since the fix solution may be rejected by a new examination after the calculation, FIG. 5 illustrates the distribution of time required for the calculation of the first fix solution.

The horizontal axis in FIG. 5 represents the time point the RTK calculation processing starts. The vertical axis in FIG. 5 represents the time (=fix time) required for the calculation of the fix solution corresponding to the time point the RTK calculation processing starts.

As illustrated in FIG. 5, the time required for the calculation of the fix solution differs depending on time point at which the RTK calculation processing starts.

Figure 6:
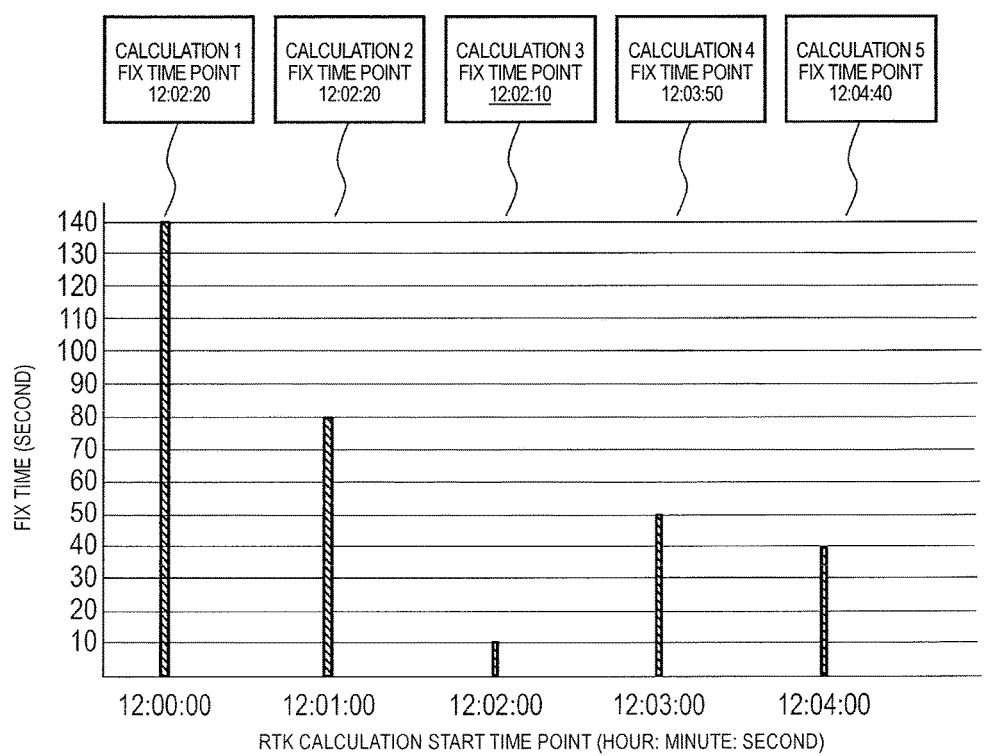
FIG. 6 is a diagram for describing effects of disclosure in the exemplary embodiment 1.

FIG. 6 is a diagram for describing effects of the disclosure in the exemplary embodiment 1.

In a situation in which the time required for the calculation of the fix solution differs depending on time point at which the RTK calculation processing starts as illustrated in FIG. 5, as in the present disclosure, when a plurality of calculation processing items are performed in parallel with different time points as start time points, the result is as illustrated in FIG. 6.

In FIG. 6, it is assumed that processor 301 performs the RTK calculation processing (respectively referred to as calculation 1, calculation 2, . . . and so on) for every minute, and it is assumed that the first RTK calculation is performed at 12:00:00. As illustrated in FIG. 6, the fix solution in calculation 3 is calculated at the earliest time despite that the calculation starts later than calculation 1 and calculation 2. If only calculation 1 is performed as the RTK calculation, the fix solution in later calculation 3 is calculated at 12:02:10 while the calculation time point of the fix solution is 12:02:20. As described above, according to the present disclosure, since the RTK calculation processing items are performed with different time points as the start time points, the fix solution in calculation 3 can be output in Step S408.

In the present exemplary embodiment, in order to perform the RTK calculation processing at regular intervals, the predetermined time point in Step S411 is set to the time obtained by adding an integer multiple of a certain constant to the time point at which the RTK calculation is performed for the first time. In this way, since RTK calculation processing is performed with a delay at every predetermined interval, there is an advantage of setting the time point of performing the RTK calculation processing without the deviation.

Here, the predetermined time point in Step S411 may be set using another method.

For example, the predetermined time point may be set based on the positioning data of base station 110 or the positioning data of positioning station 120. In this way, the RTK calculation processing is performed while the start time point thereof being sequentially delayed based on the positioning data of base station 110 and the positioning data of positioning station 120. This method is effective in a case where the relationships between the positioning data and the fix time can be found.

In addition, the predetermined time point may be set based on a positioning quality of base station 110 or positioning station 120. The positioning quality includes (1) the number of visible satellites (the more, the better), (2) a value of dilution of precision (DOP) (the less, the better), or (3) a multipath situation (the less multipath, the better) calculated by processor 201 or processor 301 represented by the positioning data. In a case where the positioning quality is good, generally it is predicted that the fix time is short. Therefore, it is preferable that the delay time is set shorter than that in a case where the positioning quality is poor.

Figure 7:
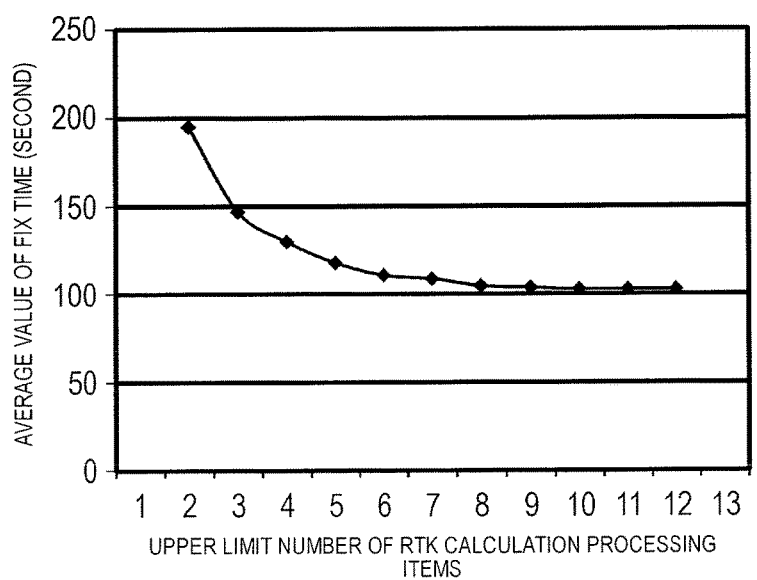
FIG. 7 is a diagram illustrating a variation of average values of fix times in a case where upper limit numbers in the RTK calculation processing are changed in the exemplary embodiment 1.

It is preferable that the upper limit number of the RTK calculation processing items set in Step S412 is equal to or greater than 3. FIG. 7 is a diagram illustrating a variation of the average values of the fix times in a case where the upper limit numbers in the RTK calculation processing are changed in the exemplary embodiment 1. In FIG. 7, the horizontal axis represents the upper limit number of the RTK calculation processing. In FIG. 7, the vertical axis represents the average value of the fix time. It is because the average fix time sharply decreases (shortened from 195 seconds (when the upper limit number is 1) to 130 seconds) when the multiplexing number exceeds 3 as illustrated in FIG. 7.

In addition, it is preferable that the upper limit numbers of the RTK calculation processing set in Step S412 are equal to or smaller than 7. It is because the resource required for the RTK calculation processing increases while the effect of shortening the average fix time is not so large in a case where the upper limit number is equal to or greater than 7 as illustrated in FIG. 7.

In a case where it is determined that any of the calculation processing items calculates the fix solution in Step S407, processor 301 may stop at least one of the other calculation processing items that do not calculate the fix solution. In the RTK method, if the fix solution is once calculated, thereafter, the positioning can be continued based on the fix solution. Accordingly, there is a possibility that other calculation processing items may not be necessary. Therefore, it is preferable to stop other calculation processing items in order to secure the resource of processor 301.

On the other hand, even in a case where it is determined that any of the calculation processing items calculates the fix solution in Step S407, processor 301 may continue to perform at least one of other calculation processing items that do not calculate the fix solution. As described above, in a case where the fix solution is rejected by the new examination thereafter, it is necessary to obtain the fix solution again through the RTK calculation processing. In this case, when other calculation processing items are not stopped, there is a possibility that the fix solution calculated in other calculation processing items can be used.

In the present exemplary embodiment, an example of using the RTK method is described as an example of the interference positioning. However, the application of the present disclosure is not limited to the exemplary embodiment in which the RTK method is used. In the present disclosure, the estimation of the integer value bias can easily be performed at a high speed. Therefore, it is possible to apply the present disclosure to a positioning system in which other interference positioning items are used, which needs the estimation of the integer value bias. For example, the present disclosure can be applied to a positioning system in which an interference positioning such as a precise point positioning (PPP) method is used.

[1-3. Effects and the Like]

As described above, processor 301 of the positioning system, the positioning method, and positioning station 120 in the present disclosure performs the interference positioning through the calculation processing based on the positioning data of base station 110 and the positioning data of positioning station 120. A plurality of calculation processing items are performed in parallel with the different time points as the start time points.

In this way, even in the situation in which the time required for calculating the fix solution differs depending on the time point at which the calculation processing starts, there is a possibility that one of the plurality of calculation processing items calculates the fix solution at an earlier time than in a case where single calculation processing performs the calculation. Therefore, it is possible to easily perform the estimation of the integer value bias at the high speed.

In addition, a plurality of calculation processing items performed by processor 301 of the positioning system, the positioning method, and positioning station 120 in the present disclosure are newly performed by performing the initialization of the parameters necessary for the calculation using the positioning data of base station 110 and the positioning data of positioning station 120 at each of the start time points.

In this way, each calculation processing calculates the fix solution under the condition different from that of other calculation processing items.

Therefore, it is possible to increase the possibility that the latter calculation processing performs the calculation of the fix solution earlier than the previous calculation processing. Accordingly, it is possible to easily perform the estimation of the integer value bias at the high speed.

In addition, processor 301 of the positioning system, the positioning method, and positioning station 120 in the present disclosure stops at least one of other calculation processing items that do not calculate the fix solution when any of the performed calculation processing items calculates the fix solution.

In this way, it is possible to save the resources of processor 301.

In addition, processor 301 of the positioning system, the positioning method, and positioning station 120 in the present disclosure performs the calculation processing while periodically delaying the start time point.

In this way, it is possible to set the time point of performing the calculation processing without the deviation.

Therefore, it is possible to easily perform the estimation of the integer value bias at the high speed.

In addition, processor 301 of the positioning system, the positioning method, and positioning station 120 in the present disclosure performs the calculation processing while sequentially delaying the start time point thereof based on the positioning data of base station 110 or the positioning data of positioning station 120.

In this way, in a case where the relationships between the positioning data and the fix time can be found, it is possible to easily perform the estimation of the integer value bias at the high speed.

In addition, processor 301 of the positioning system, the positioning method, and positioning station 120 in the present disclosure performs the calculation processing while sequentially delaying the start time point thereof based on the positioning quality of base station 110 or positioning station 120. In this case, the delay time of the calculation processing can be shorter in a case where the positioning quality is good than that in a case where the positioning quality is poor.

In this way, in a case where the approximate length of the fix time can be predicted, it is possible to easily perform the estimation of the integer value bias at the high speed.

Other Exemplary Embodiments

As described above, the exemplary embodiment 1 is described as an example of the technology disclosed in this application. However, the technology disclosed in the present disclosure is not limited to the above description, and can be applied to the exemplary embodiments on which the changes, replacements, additions, and omissions are appropriately performed.

Hereinafter, other exemplary embodiments will be described.

Exemplary Embodiment 2

An exemplary embodiment 2 will be described using FIG. 8.

Figure 8:
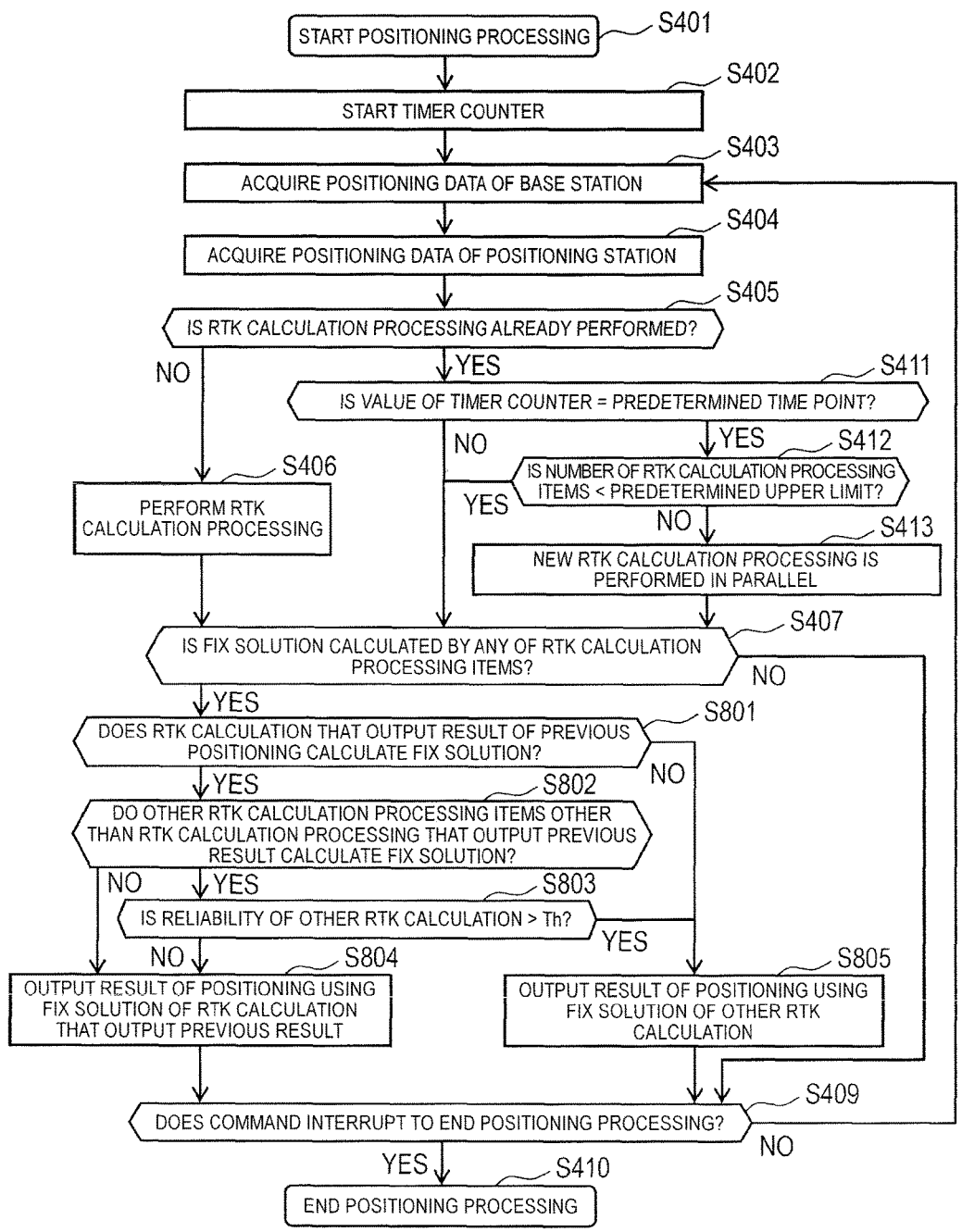
FIG. 8 is a flowchart illustrating positioning processing in an exemplary embodiment 2.

FIG. 8 is a flowchart illustrating the positioning processing in the exemplary embodiment 2.

Step S408 in the exemplary embodiment 1 is changed to Step S801 to Step S805 in the exemplary embodiment 2.

In Step S407, in a case where processor 301 determines that any of the RTK calculation processing items calculates the fix solution (YES in Step S407), the processing proceeds to Step S801.

In Step S801, processor 301 determines whether or not the RTK calculation processing that outputs the result of previous positioning calculates the fix solution. The RTK calculation processing that outputs the result of previous positioning means the RTK calculation used in the calculation of the result of positioning output in the most recent Step S804 or Step S805 (that is, the RTK calculation that calculated the fix solution used in the result of positioning), in the loop processing (from S409 to S403) illustrated in FIG. 8. In some cases, in the RTK calculation, the fix solution is not calculated after a certain period of time elapses even if the fix solution is once calculated. In Step S801, processor 301 determines whether or not the calculation processing that calculated the fix solution used for outputting the result of previous positioning calculates the fix solution after a predetermined period of time elapses.

In Step S802, processor 301 determines whether or not any of other RTK calculation processing items other than the RTK calculation processing that output the result of previous positioning calculates the fix solution. In a case where any of other RTK calculation processing items calculates the fix solution (YES in Step S802), the processing proceeds to Step S803.

In Step S803, processor 301 determines whether or not a reliability of other RTK calculation which is determined to be calculating the fix solution in Step S802 exceeds a threshold value (Th). The reliability is a statistical degree indicating whether or not the result of positioning calculated using the solution by the RTK calculation is close to a true value. In the present exemplary embodiment, an ambiguity ratio (AR) value frequently used as the reliability of the RTK calculation is set to be the reliability. In the present exemplary embodiment, processor 301 calculates the AR value relating to the RTK calculation every time the RTK calculation calculates the solution.

Here, it is preferable that the threshold value in Step S803 is a value obtained by adding a predetermined value to the reliability of the RTK calculation processing that output the result of previous positioning. In this way, it can be suppressed that the output coordinates are scattered on the discrete places even in a case where the reliability RTK calculation processing that output the result of previous positioning and the reliability of other RTK calculation which is determined to be calculating the fix solution in Step S802 are close to each other.

In Step S804 (NO in Step S803), processor 301 outputs the result of positioning using the fix solution of the RTK calculation that output the result of previous positioning.

In Step S805 (YES in Step S803), processor 301 outputs the result of positioning using the fix solution of other RTK calculation which is determined to be calculating the fix solution in Step S802.

Exemplary Embodiment 3

An exemplary embodiment 3 will be described using FIG. 9.

Figure 9:
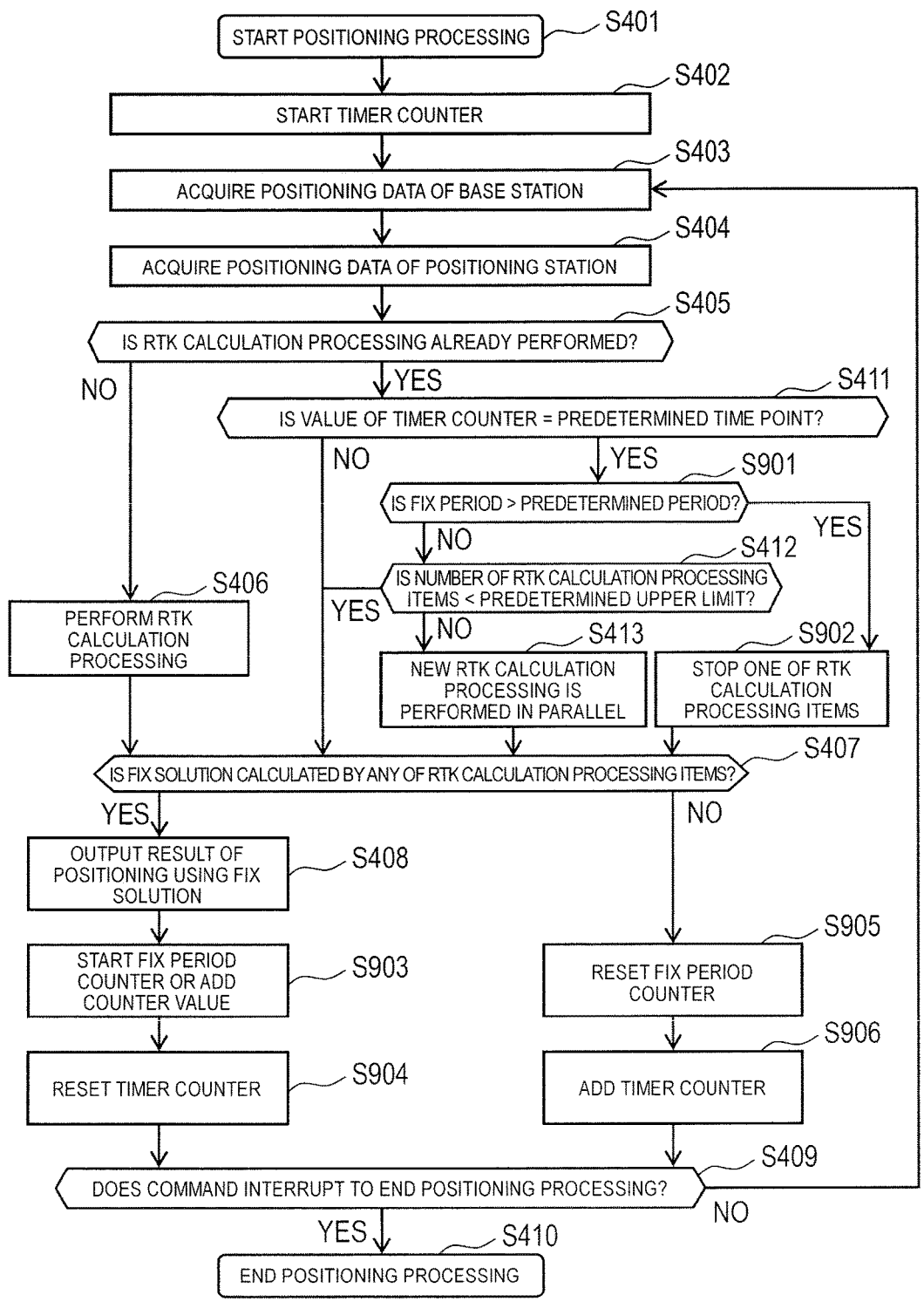
FIG. 9 is a flowchart illustrating positioning processing in an exemplary embodiment 3.

FIG. 9 is a flowchart illustrating positioning processing in the exemplary embodiment 3.

In the exemplary embodiment 3, Step S901 to Step S906 are added to the positioning processing in the exemplary embodiment 1.

In a case where the timer counter value reaches to the predetermined time point in Step S411 (YES in Step S411), the processing proceeds to Step S901.

In Step S901, processor 301 determines whether or not a fix period is longer than a predetermined period.

The fix period will be described using Step S903 and Step S905. The fix period means a period during which any of the RTK calculation processing items continues to calculate the fix solution. In the present exemplary embodiment, in a case where any of the RTK calculation processing items calculates the fix solution (YES in Step S407), the processing proceeds to Step S903 via Step S408 or in parallel. In Step S903, processor 301 starts a fix period counter that counts the fix period in a case of not being started yet, and adds the counter value in a case of being started. On the other hand, in a case where any of the RTK calculation processing items does not calculate the fix solution (NO in Step S407), the fix period counter is reset in Step S905. Processor 301 can measure the period during which any of the RTK calculation processing items continues to calculate the fix solution with reference to the fix period counter.

In this way, in a case where the measured fix period is shorter than the predetermined period, the processing proceeds to Step S412.

On the other hand, in a case where the measured fix period is longer than the predetermined period, the processing proceeds to Step S902.

In Step S902, processor 301 stops one of the RTK calculation processing items. In this way, it is possible to decrease the excessively performed RTK calculation processing. As the way of selecting the RTK calculation processing to be stopped, the selection may be performed from the RTK calculations that do not calculate the fix solution, or may be performed based on an index indicated in Step S1010 described below. The processing in Step S902 may be performed only in a case where the number of performed RTK calculation processing items is smaller than a predetermined number.

In addition, a non-fix period will be described using Step S904 and Step S906. The non-fix period means a period during which any of the RTK calculation processing items does not calculate the fix solution (in principle). That is, in a case where any of the RTK calculation processing items does not calculate the fix solution (NO in Step S407), in Step S906, processor 301 adds the timer counter for counting the non-fix period. On the other hand, in a case where any of the RTK calculation processing items calculates the fix solution (YES in Step S407), the timer counter is reset in Step S904. Processor 301 can measure the period during which any of the RTK calculation processing items does not calculate the fix solution with reference to the timer counter. Here, when the timer counter used in determination in Step S411 is used as a counter for counting the non-fix period, it is possible to start to perform the new calculation processing in parallel (Step S413) under one of the conditions that any of the RTK calculation processing items does not calculate the fix solution. That is because it is determined to be NO in Step S411 in a state in which the timer counter is reset and the counting is not performed, or it is determined to be YES in Step S411 when the timer counter value is added. In this way, when the new calculation processing is started to be performed in parallel under one of the conditions that any of the RTK calculation processing items does not calculate the fix solution, it is possible to suppress the increase of the excessive RTK calculation processing.

In Step S904, processor 301 may reset the timer counter with reference to the fix period counter in a case where the fix period is longer than the predetermined period.
In this way, in the RTK calculation being performed, in a case where the periods during which the fix solution is output and is not output are alternately appeared at short timing, it is possible to suppress the determination in Step S411 to be continuously NO.
As a result, it is possible to increase the number of RTK calculation processing items up to an appropriate number.

Exemplary Embodiment 4

An exemplary embodiment 4 will be described using FIG. 10.

Figure 10:
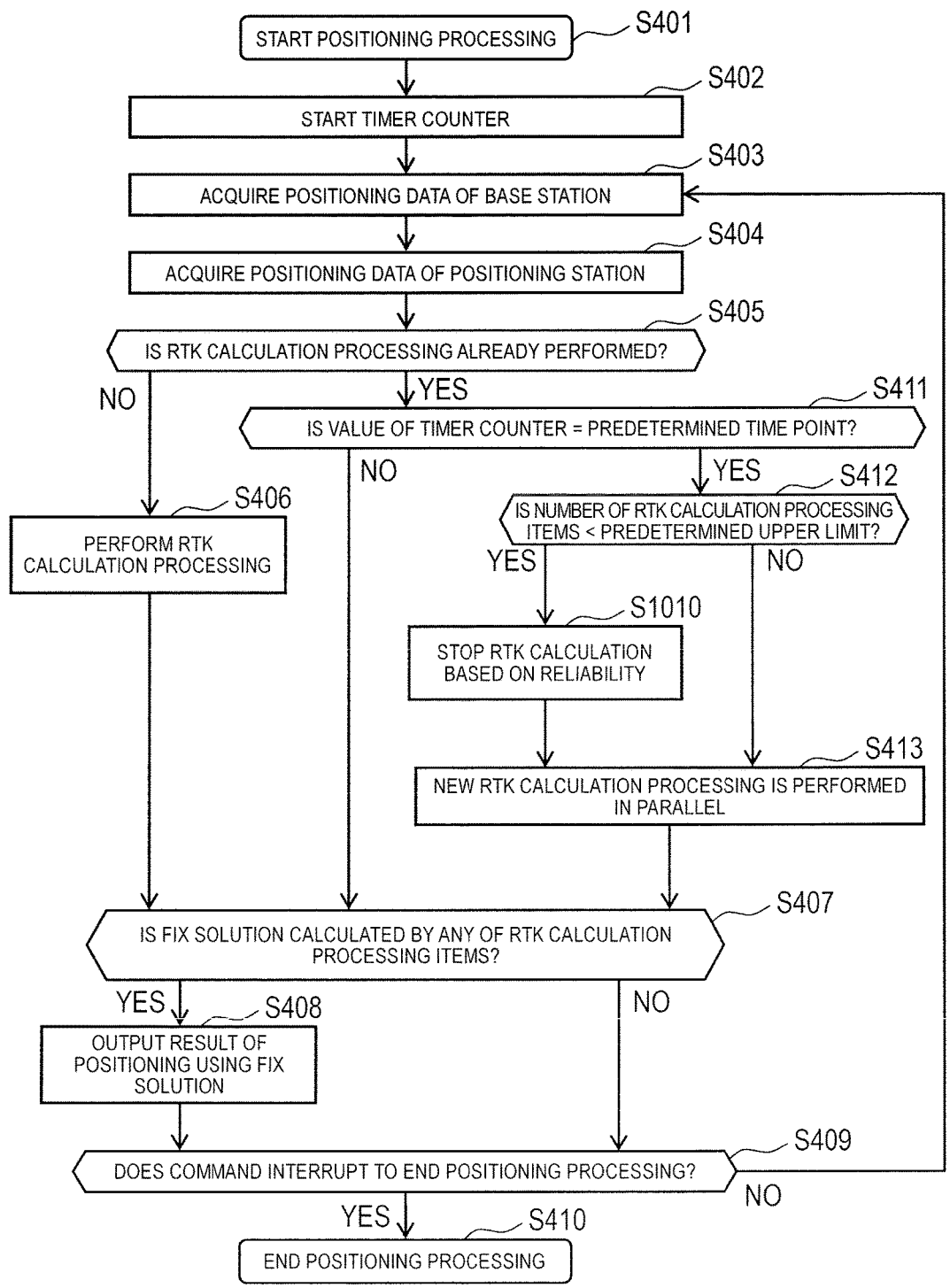
FIG. 10 is a flowchart illustrating positioning processing in an exemplary embodiment 4.

FIG. 10 is a flowchart illustrating the positioning processing in the exemplary embodiment 4.

In the exemplary embodiment 4, Step S1010 is added to the positioning processing in the exemplary embodiment 1.

In Step S412, in a case where processor 301 determines that the number of RTK calculation processing items exceeds the predetermined upper limit (YES in Step S412), the processing proceeds to S1010.

In Step S1010, processor 301 stops the RTK calculation based on the reliability. "Based on the reliability" may be set so as to select the RTK calculation having the lower reliability compared to that of other calculations such cases as (1) the RTK calculation having the lower reliability than a predetermined value is stopped, and (2) the RTK calculation having the lowest reliability is stopped. Similar to the exemplary embodiment 2, a known index such as the AR value may be used as the reliability. In addition, processor 301 performs the new RTK calculation in parallel in Step S413 after (or before) Step S412. In this way, in a case where the number of RTK calculations reaches the upper limit, it is possible to exchange the RTK calculation having the low reliability and the new RTK calculation. As a result, the possibility that any of the RTK calculations can calculate the fix solution earlier is increased.

In addition, a new exemplary embodiment can be made by combining each configuration element of the exemplary embodiments 1 to 4 described above.

The exemplary embodiments described above are intended to exemplify the technology in the present disclosure. Therefore, various changes, replacements, additions, omissions, or the like can be made within the scope of claims or the equivalent thereof.

INDUSTRIAL APPLICABILITY

The present disclosure can be applied to a measurement system used in the interference positioning method.

REFERENCE MARKS IN THE DRAWINGS 100 positioning system
110 base station
120 positioning station
201 processor
202 storage unit
203 input unit
204 output unit
205 communicator
206 receiver
210 bus
301 processor
302 storage unit
303 input unit
304 output unit
305 communicator
306 receiver
310 bus

The invention claimed is:

1. A positioning system comprising:
a base station; and
a positioning station,
wherein the positioning system performs interference positioning through calculation processing based on positioning data of the base station and positioning data of the positioning station for determining a position of the positioning station, and
wherein a plurality of calculation processing items for performing the interference positioning are performed in parallel with different time points as start time points, and
wherein, when any one of the plurality of the calculation processing items calculates a fix solution, the positioning system outputs the position of the positioning station based on the calculated fix solution without waiting for remaining calculation processing items to complete their calculations.

2. The positioning system of claim 1,
wherein the plurality of calculation processing items are performed by performing initialization of parameters necessary for the calculation using the positioning data of the base station and the positioning data of the positioning station in a vicinity of each of the start time points.

3. The positioning system of claim 1,
wherein the positioning system stops at least one of the remaining calculation processing items, which did not calculate the fix solution before the any one of the performed calculation processing items calculated a fix solution.

4. The positioning system of claim 1,
wherein the positioning system performs the calculation processing while periodically delaying a start time point thereof.

5. The positioning system of claim 1,
wherein the positioning system performs the calculation processing while sequentially delaying a start time point thereof based on the positioning data of the base station or the positioning data of the positioning station.

6. The positioning system of claim 1,
wherein the positioning system performs the calculation processing while sequentially delaying a start time point thereof based on a positioning quality of the base station or the positioning station, and
wherein a delay time of the calculation processing is shorter in a case where the positioning quality is good than that in a case where the positioning quality is poor.

7. The positioning system of claim 1,
wherein the positioning system determines whether or not the calculation processing calculates the fix solution and whether or not other calculation processing calculates the fix solution, after a predetermined period of time elapsed from the time when the any one of the performed calculation processing items calculates the fix solution, and wherein the positioning system outputs a result of positioning based on the fix solution calculated by the other calculation processing under a condition that a reliability of the other calculation processing is higher than a value obtained by adding a predetermined value to a reliability of the calculation processing that calculated the fix solution, in a case where the calculation processing that calculated the fix solution calculates the fix solution and any one of the remaining calculation processing items calculates the fix solution.

8. The positioning system of claim 1,
wherein the positioning system stops at least one of the plurality of performed calculation processing items under a condition that the positioning system continuously receives fix solutions from the performed plurality of calculation processing items for a period longer than a predetermined period.

9. The positioning system of claim 1,
wherein the positioning system starts performing of new calculation processing in parallel in addition to the performed calculation processing under a condition that none of the performed plurality of calculation processing items finishes calculating the fix solution for a predetermined time period.

10. The positioning system of claim 1,
wherein the positioning system stops at least one of the plurality of calculation processing items based on a reliability of the performed calculation processing in a case where a number of the performed plurality of calculation processing items is equal to or greater than a predetermined number.

11. A positioning method comprising:
generating, by a base station, positioning data of the base station;
generating, by a positioning station, positioning data of the positioning station;
performing, by the positioning station, interference positioning through calculation processing based on the positioning data of the base station and the positioning data of the positioning station for determining a position of the positioning station,
wherein a plurality of calculation processing items for performing the interference positioning are performed in parallel with different time points as start time points, and
wherein, when any one of the plurality of the calculation processing items calculates a fix solution, the positioning system outputs the position of the positioning station based on the calculated fix solution without waiting for remaining calculation processing items to complete their calculations.

12. The positioning method of claim 11,
wherein the plurality of calculation processing items are performed by performing initialization of parameters necessary for the calculation using the positioning data of the base station and the positioning data of the positioning station in a vicinity of each of the start time points.

13. The positioning method of claim 11, further comprising:
stopping at least one of the remaining calculation processing items, which did not calculate the fix solution before the any one of the performed calculation processing items calculated a fix solution.

14. The positioning method of claim 11,
wherein the calculation processing is performed while periodically delaying a start time point thereof.

15. The positioning method of claim 11,
wherein the calculation processing is performed while sequentially delaying a start time point thereof based on the positioning data of the base station or the positioning data of the positioning station.

16. The positioning method of claim 11,
wherein the calculation processing is performed while sequentially delaying a start time point thereof the based on a positioning quality of base station or the positioning station, and
wherein a delay time of the calculation processing is shorter in a case where the positioning quality is good than that in a case where the positioning quality is poor.

17. The positioning method of claim 11, further comprising:
determining whether or not the calculation processing calculates the fix solution and whether or not other calculation processing calculates the fix solution, after a predetermined period of time elapsed from the time when the any one of the performed calculation processing items calculates the fix solution, and
wherein the positioning method outputs a result of positioning based on the fix solution calculated by the other calculation processing under a condition that a reliability of the other calculation processing is higher than a value obtained by adding a predetermined value to a reliability of the calculation processing that calculated the fix solution, in a case where the calculation processing that calculated the fix solution calculates the fix solution and any one of the remaining calculation processing items calculates the fix solution.

18. The positioning method of claim 11,
wherein the positioning system stops at least one of the plurality of performed calculation processing items under a condition that the positioning system continuously receives fix solutions from the performed plurality of calculation processing items for a period longer than a predetermined period.

19. The positioning method of claim 11,
wherein the positioning method starts performing of new calculation processing in parallel in addition to the performed calculation processing under a condition that none of the performed plurality of calculation processing items finishes calculating the fix solution for a predetermined time period.

20. The positioning method of claim 11,
wherein the positioning method stops at least one of the plurality of calculation processing items based on a reliability of the performed calculation processing in a case where a number of the performed plurality of calculation processing items is equal to or greater than a predetermined number.

21. A positioning station comprising:
a processor;
a communicator that communicates with a base station; and
a receiver that receives a positioning signal from a satellite,
wherein the processor performs interference positioning through calculation processing based on positioning data of the base station and positioning data of the positioning station for determining a position of the positioning station, and wherein a plurality of calculation processing items for performing the interference positioning are performed in parallel with different time points as start time points, and wherein, when any one of the plurality of the calculation processing items calculates a fix solution, the positioning system outputs the position of the positioning station based on the calculated fix solution without waiting for remaining calculation processing items to complete their calculations.

* * * * *